May 30, 1961  W. A. EATON  2,986,238
FRICTIONAL MECHANISM
Filed Oct. 14, 1958  3 Sheets-Sheet 1
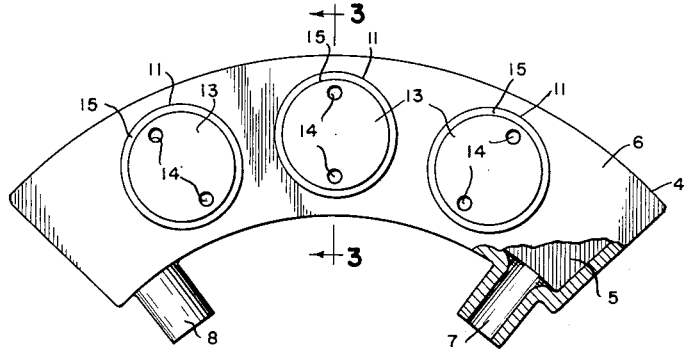
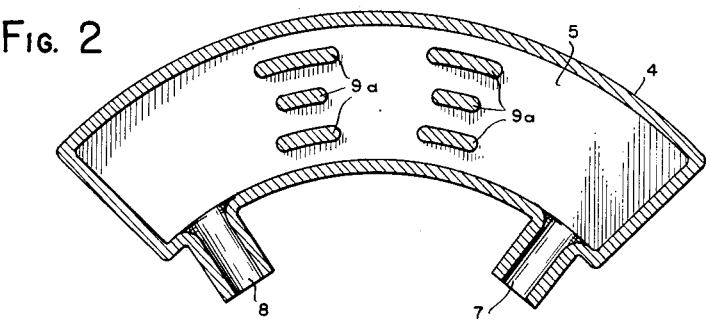
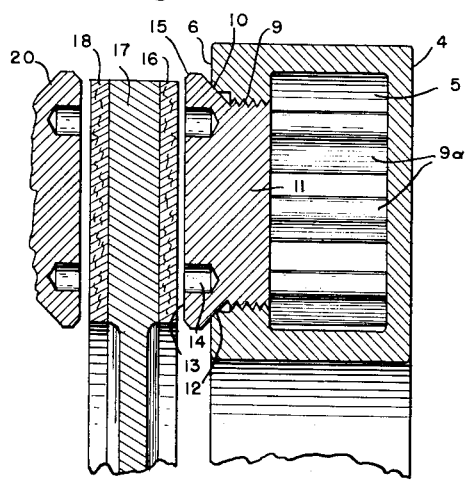
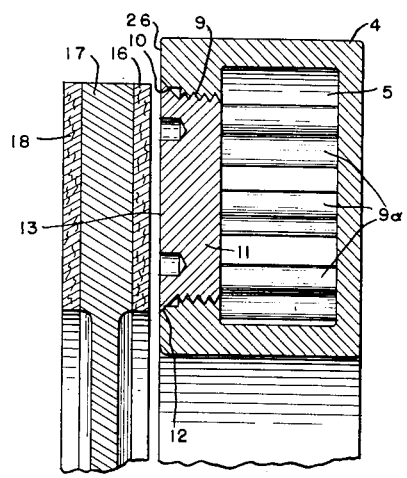
INVENTOR
WILFRED A. EATON
BY Scrivener & Parker
ATTORNEY May 30, 1961  W. A. EATON  2,986,238
FRICTIONAL MECHANISM
Filed Oct. 14, 1958  3 Sheets-Sheet 2
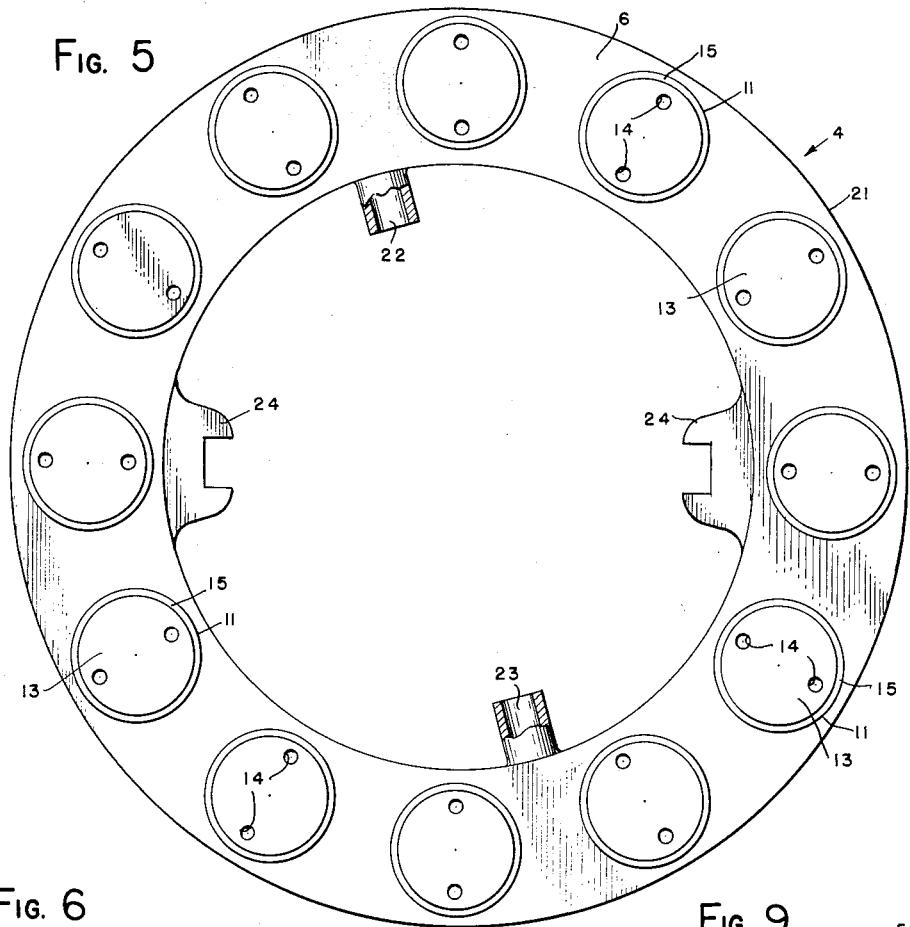
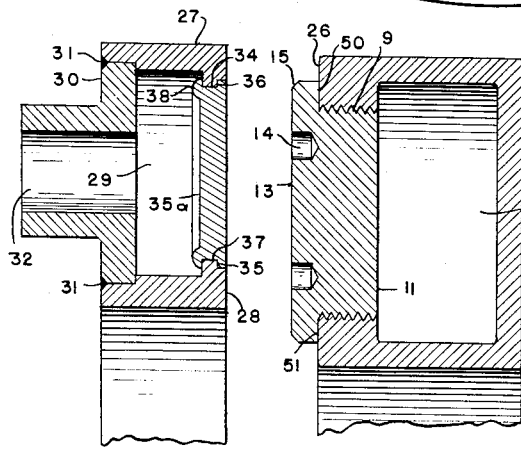
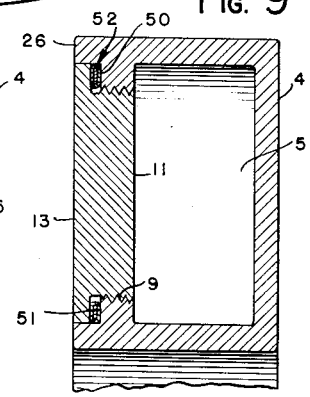
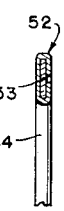
INVENTOR
WILFRED A. EATON
BY *Scrivener & Parker*
ATTORNEY May 30, 1961 W. A. EATON 2,986,238
FRICTIONAL MECHANISM
Filed Oct. 14, 1958 3 Sheets-Sheet 3

INVENTOR
WILFRED A. EATON
BY Scrivener & Parker
ATTORNEY

United States Patent Office 2,986,238
Patented May 30, 1961

2,986,238

FRICTIONAL MECHANISM

Wilfred A. Eaton, Box 174, North Woodbury, Conn., assignor to Roy S. Sanford and Erling D. Sedergren, both of Woodbury, Roger H. Casler and James O. Eames, both of Washington, and Wilfred A. Eaton, North Woodbury, all of Connecticut Filed Oct. 14, 1958, Ser. No. 767,170

5 Claims. (Cl. 188—251)

This invention relates to liquid-cooled frictional mechanisms, and more particularly for such mechanisms in connection with friction brakes and friction clutches.

The metals, copper and silver, and some of the very high-conductivity alloys thereof, have been found to be particularly advantageous for use as friction elements in liquid-cooled brakes of the type wherein the metal friction elements are in engagement with the cooling liquid and are adapted for engagement with substantially non-metallic composition friction linings of the type comprising fiber reinforced materials including suitable binders and the like and suitable friction augmenting and modifying materials, commonly known to the trade as brake linings. Such brake linings are relatively non-heat-conductive. Due to the ductility of such metals, however, it has been found difficult in many instances to properly support the metal friction elements on the brake shoe, and at the same time prevent leakage of the cooling liquid from the brake shoe, and it is the primary object of the present invention to provide means for overcoming these difficulties.

Another object of the invention is the provision of a novel brake shoe of the liquid cooled type.

Still another object of the invention is the provision of a brake shoe or friction element which can be readily fabricated at reasonable cost.

Yet another object of the invention is to provide a novel metallic friction element adapted for cooling by a circulating liquid.

A further object is the provision of a composite brake shoe.

These and other novel features and objects of the invention will be more readily apparent from the following detailed description when taken into connection with the accompanying drawings. It is to be expressly understood, however, that the description and drawings are not to be taken as defining the limits of the invention, reference being had for this purpose to the appended claims.

In the drawings, wherein similar reference numerals refer to similar parts throughout the several views, Fig. 1 is a side elevation, partially in section of a brake shoe constructed in accordance with the principles of the invention;

Fig. 2 is a plan sectional view of the brake shoe of Fig. 1;

Fig. 3 is an enlarged sectional view of the brake shoe of Fig. 1 taken along line 3—3;

Fig. 4 is an enlarged sectional view similar to Fig. 3 showing a modification of the invention;

Fig. 5 is a side elevational view, partially in section, of another form of brake shoe;

Fig. 6 is a sectional view similar to Fig. 3, showing another modification of the invention;

Fig. 8 is a sectional view of a modification of the structure of Fig. 3;

Fig. 9 is a sectional view showing a modification of the structure of Fig. 8, and Fig. 10 is a partial sectional view of one of the parts shown in Fig. 9.

Figure 7:
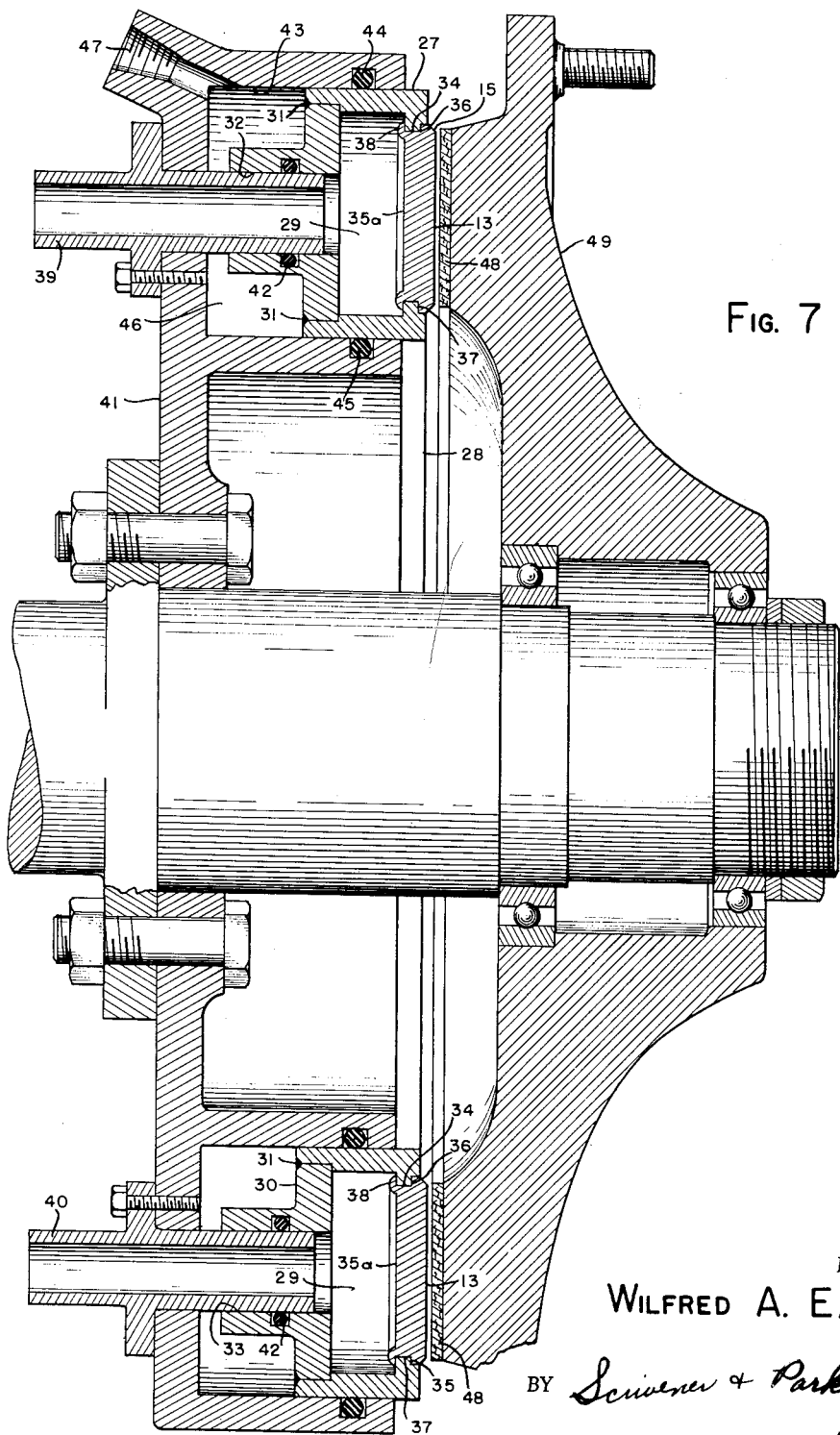
Fig. 7 is a sectional view of a brake assembly incorporating the principles of the invention.

Referring first to Figs. 1 and 3, the mechanism includes a shoe or strength member 4 formed preferably of a metal such as cast iron or aluminum, for example, having a cooling chamber 5 therein and a substantially flat arcuate wall 6, the member being provided with ports 7 and 8 for the admission and discharge of a circulating cooling liquid. As shown in Fig. 3, a threaded cylindrical bore 9 is provided in the wall 6, there being three of these bores in the embodiment shown in Fig. 1. Ribs 9a may be provided as indicated in Figs. 2 and 3 for connecting the front and back walls of the strength member between the bores to prevent distortion during braking, the ends of these ribs terminating adjacent the edges of the bores. At the outer end of each bore a tapered valve like seat 10 is provided and a cylindrical metal friction element 11 of high-thermal conductivity metal, preferably copper, is threadedly received in said bore. The tapered seat 10 is concentric with the bore, and the metal friction element is provided with a complementary tapered valve like seat portion 12 which is concentric with the axis of the element. The threads on the metal element and in the bore are preferably made with a slight clearance in order to permit self-alignment of the metal friction element in the bore, and the construction is such that when the metal friction element is screwed into the bore as shown, the complementary seats 10 and 12 contact in sealing engagement in such a manner as to prevent the escape of any cooling liquid from the cooling chamber 5. In effect, therefore, the seat 10 is like a valve seat, and the metal friction element with its tapered seat 12 acts like a valve to close the opening in the bore. The outer end of the friction element is provided with a flat friction surface 13 in a plane normal to the axis of the element, small bores 14 being provided in the face of the element to receive a spanner wrench for screwing the element into the bore. It will be understood, however, that other suitable means may be provided for engaging a wrench when the friction element is inserted in the bore. In order to prevent damage to the brake lining which engages the friction surface of the metal element, the cylindrical edges are preferably formed with a tapered portion 15 as shown. The strength member 4 is adapted to be moved by suitable actuating means, not shown, to the left to effect engagement of the friction elements 11 with an annular friction ring of brake lining or composition lining 16 secured to a rotatable friction disc member 17 as shown. The other side of the disc member may have a similar composition friction lining member 18 as shown, which may be engaged by metal friction elements 20 carried by a second strength member, not shown, similar to strength member 4.

From the foregoing, it will be apparent that inner face of the cylindrical metal friction element is exposed to the action of cooling liquid in the chamber 5 of the strength member, while the smooth outer friction surface is engageable with the composition lining 16 on the member 17 movable relative to the strength member. Although three friction elements are shown in Fig. 1, it will be understood that one or more elements can be used depending upon the type of brake desired. For example, in a so-called spot disc brake, it may be desirable to use only one element or three or four elements. On the other hand in the event of severe service it may be desirable to have the strength member 4 formed as a full annular ring 21 as shown in Fig. 5, this ring being provided with a continuous cooling liquid channel, not shown, in the same manner as indicated in Fig. 3.

Friction elements 11 are evenly spaced on one or both annular walls of this ring, and may be inserted and maintained in position in the same manner as shown in Fig. 3. This ring is provided with spaced apart ports 22 and 23 for the admission and release of cooling liquid from the annular chamber of the ring, the liquid entering on one side of the ring and flowing in either direction from the point of entrance to the outlet on the other side of the ring as indicated. Since the strength member or shoe 4 or 21, as the case may be, can be made of a relatively strong metal such as cast iron or aluminum, it will be apparent that due to the shape of the metal friction elements, they can be readily supported against undue distortion due to braking forces without the necessity of making the thickness of the friction element so great as to materially retard the flow of heat from the outer friction surfaces thereof to the inner surfaces which are exposed to the action of the cooling liquid in the cooling liquid chamber. Also these friction elements can be readily inserted in such a manner as to entirely prevent any leakage of the cooling liquid. In addition, both the friction elements and the strength members can be readily fabricated by conventional machinery without undue cost. In the case of the brake shoe arrangement shown in Fig. 5, it will be understood that the shoe may be slidably mounted on a suitable support not shown and supported against rotation by anchor members 24, provided with slots for slidably mounting the strength member on a suitable support.

In some instances, and particularly in the event a moderately soft composition brake lining is utilized, it may be desirable to have the outer friction surfaces of the metal friction elements in the same plane as the outer surface of the wall on the strength member which supports these elements in order to prevent any edges on the element from damaging the brake lining. If this arrangement is desired, it may be achieved as shown in Fig. 4. In this case, the strength member 4, which may be a portion of an arc or a full annular member as shown respectively in Figs. 1 or 5, is provided with a cooling liquid chamber 5 having inlet and outlet ports, not shown, a threaded bore 9, and a metal friction element of high-thermal conductivity metal 11 threadedly received in said bore. A tapered seat 10 is provided on the strength member and is adapted to engage a tapered seat 12 on the outer end of the friction element to prevent the leakage of any cooling liquid from the chamber 5. In this embodiment of the invention, the left side of the strength member 4 is provided with a smooth annular surface 26, and the metal friction elements 11 are so constituted that the smooth outer friction surfaces 13 thereof lie in the plane of the surface 26. Thus a smooth annular surface is provided on the left face of the strength member 4 comprising a combination of the surface 26 and the surfaces 13 on the metal friction elements, this combined surface being adapted to frictionally engage the composition friction ring 16 on the brake disc member 17. In this connection, it will be understood that if necessary, the friction elements can be screwed in and seated in their respective bores, and then faced off in such a manner that the friction surfaces thereof lie in the plane of the surface 26 of the strength member. Since the metal friction elements of high-thermal conductivity metal remove heat from the interface very rapidly during the brake application, the tendency for the metal of the strength member to overheat due to poor thermal conductivity is minimized, while at the same time a very smooth operation is obtained due to the lack of any broken or irregular surface engaging the brake lining. It is also considered that in the event any copper or silver is abraded from the surfaces of the metal friction elements, it will tend to imbed in the surface of the metal of the strength member 4 and improve the friction characteristics thereof, this being particularly true in the event the strength member is made of cast iron. With regard to the use of aluminum as a friction element, difficulty has been experienced in some installations in cases where the thermal load is very high, due to the low melting point of the metal, but due to the action of the high thermal conductivity friction elements, the surfaces of which alternate with adjacent aluminum surfaces, the heat will be sufficiently controlled to prevent damage to the aluminum surface.

In the event it is desired to avoid machining the bores on the strength member to the extent of providing threads therein, and also to avoid the machining of threads on the metal friction elements, the brake shoe may be made as shown for example in Figs. 6 and 7. Referring first to Fig. 6, it will be noted than an annular brake member 27 is provided with a wall 28 at the right end thereof, and an annular cooling liquid channel 29, closed at the left end by an annular ring 30, this preferably being secured to the member 27 as by means of brazing or welding as shown at 31. Bores 32 and 33 are provided in the member 30 for the admission and release of cooling liquid from the channel 29, and the wall at the right end of the member 27 is provided with a plurality of cylindrical bores 34 provided with seats 35 concentric with the bores. Metal friction elements 35a are provided, these being cylindrical elements formed primarily of copper or silver, each being provided with a seat 36 adapted to sealingly engage the seat 35 on the strength member, and having a cylindrical portion 37 adapted to be inserted in the bore 34. When the friction element is inserted in the bore, the left end is upset or riveted over at 38 to firmly secure the friction element in the bore and to effect sealing engagement between the seats 35 and 36.

In this embodiment of the invention, it will be apparent that no threading is required in the bores, and that the brake shoe may be fabricated by first machining the bores 34 in the right wall of the strength member, and thereafter inserting and riveting the metal friction elements in place, whereupon the left end of the cooling liquid channel 29 is closed by the closure member 30 which is soldered, brazed, welded or otherwise secured in place in such a manner as to prevent leakage of cooling liquid from the chamber 29. In the form shown in Fig. 7, the metal friction element is provided with the smooth outer friction surface 13 as was the case in Fig. 3, and may also be provided with a tapered peripheral portion 15 as also shown in Fig. 3. If it is desired to have the friction face of the element flush with the face 28 of the strength member 27, this may be done as shown in Fig. 6, the friction element being so constituted as to have a smooth outer friction surface flush with the surface 28 on the strength member 27.

Referring again briefly to Fig. 7, it will be understood that conduits for cooling liquid 39 and 40 are mounted on a suitable backing plate 41, and that these conduits at their right ends slidably engage bores 32 and 33 in the closure member 30, thus providing means for circulating cooling liquid through channel 29, sealing rings 42 being provided to prevent leakage. The backing plate has an annular cylinder bore 43 in which strength member 27 is slidably mounted and sealed by sealing rings 44 and 45. Thus a pressure chamber 46 is formed between the members 27 and 30 and the backing plate, this being connected to a source of fluid pressure through a port 47. When fluid under pressure is supplied to chamber 46 the brake shoe is moved to the right to engage composition lining 48 on a wheel 49.

In the event the coefficients of thermal expansion of the metal of the strength member and the plugs differ greatly, it is conceivable that under some circumstances the structures of Figs. 3 and 4 may tend to leak, due to enlargement of the bores 9 and a consequent increase in diameter of the valve seats 10 greater than the corresponding increase in the diameter of valve seats 12 on the plugs 11. This difficulty can be substantially overcome by the structure shown in Figs. 8 and 9, wherein flat instead of tapered valve like seats are utilized, as it will be understood that with this construction thermal expansion radially of the plugs and bores will have no tendency to effect disengagement of the valve seats.

Referring first to Fig. 8, we have a strength member 4 similar to that shown in Figs. 3 and 4 having a cooling liquid channel 5 and threaded bore or bores 9 adapted to threadedly receive cylindrical plugs 11 formed primarily of copper or silver. Bore 9 is provided at its left end with a flat valve like seat 50 adapted to sealingly engage a flat valve like seat 51 formed at the left end of the plug as shown. The friction surface 13 of the plug may extend beyond the surface 26 at the left end of the plug as shown in Fig. 8, or may be flush with the surface as shown in Fig. 9.

As a further precaution against leakage, the structure of Fig. 9 may be utilized, wherein a ring-like gasket 52 is interposed between the valve like seats 50 and 51 as shown. Although various types of gasket may be utilized, it is contemplated that a gasket of the copper-asbestos type constructed in a manner similar to a spark plug gasket may be advantageously utilized. Such a gasket is illustrated in Fig. 10, and includes an annular ring 53 of compressible heat resistant asbestos or similar material covered with a layer of thin sheet copper 54, the copper being formed as shown to retain the asbestos ring. Such a gasket is substantially unaffected by the temperatures experienced in brakes of this general type, and provides a simple and effective liquid seal for the life of the brake shoe. Such gaskets are available commercially, and their manufacture is well understood by those skilled in the art. It should also be understood that if desired, similar gaskets can be utilized between the valve seats in the other illustrated structures.

The term "high thermal conductivity metals" as used in this application is intended to refer to substantially pure copper and silver and some of the high thermal conductivity alloys of these metals which include small amounts of other metals, as well as to copper containing small amounts of silver.

Although, as heretofore stated, some of the high conductivity alloys of copper and silver may be utilized, best results are obtained by forming the metal friction elements of substantially pure electrolytic copper. Commercially available grades of the metal copper are listed in the pamphlet "Commercially Important Wrought Copper Alloys," copyright 1948, Chase Brass & Copper Company, Waterbury, Conn., page 22, and in the pamphlet "Revere Copper and Copper Alloys," copyright 1949, Revere Copper & Brass, Inc.; New York, N.Y., page 5.

Although the invention has been illustrated and described with considerable particularity, it is to be understood that the same is not to be considered as limited thereby, and that other embodiments of the invention may well suggest themselves to those skilled in the art. Reference will, therefore, be had to the appended claims for a definition of the limits of the invention.

What is claimed is:

1. A liquid cooled brake shoe for a friction brake of the disc type including a rigid metal shoe member having a chamber for cooling liquid formed therein, inlet and outlet ports in the shoe for respectively supplying cooling liquid to the chamber and discharging cooling liquid from the chamber, a threaded bore in one wall of the chamber having a seat formed at the outer end of the bore concentric therewith, and a cylindrical friction element formed primarily of a metal selected from a group consisting of copper and silver threadedly received in said bore with the inner end of element exposed in said chamber and the outer end having a flat friction surface formed thereon in a plane normal to the axis of the element, said element having a seat formed thereon adjacent the outer end thereof concentric with the axis of the element and in sealing engagement with the first named seat.

2. A liquid cooled brake shoe for a disc brake as set forth in claim 1, wherein said one wall of the chamber is an arcuate substantially flat wall and is provided with a plurality of said threaded bores having said seats formed therein and each having one of said friction elements threadedly received therein, the corresponding seats in said bores and on said elements being in sealing engagement.

3. A liquid cooled brake shoe for a friction brake of the disc type as set forth in claim 1, wherein said one wall of the chamber is an arcuate flat wall lying in a plane normal to the axis of said arcuate wall and is provided with a plurality of said threaded bores having said seats formed therein and each having one of said friction elements threadedly received therein, the corresponding seats in said bores and on said elements being in sealing engagement and said wall having an outer flat friction surface formed thereon lying in the same plane as the flat friction surfaces on said elements.

4. A liquid cooled annular brake shoe for a disc brake including a rigid annular metal brake shoe member having an annular chamber for cooling liquid formed therein having spaced apart inlet and outlet ports for the admission and discharge of cooling liquid and having spaced apart annular walls, spaced apart cylindrical bores in at least one of said walls having their axes parallel to the axis of said annular shoe member, the bores having threaded portions concentric therewith and each bore having a valve like seat formed at the outer end thereof concentric with the bore, and a cylindrical friction element formed primarily of a metal selected from a group consisting of copper and silver in each of said bores, said elements having threaded portions concentric therewith and received in the corresponding threaded portions in the bores and having concentric valve like seats formed adjacent the outer ends thereof in sealing engagement with the corresponding valve like seats in the bores, the inner ends of the plugs being exposed in said chamber and the outer ends having flat cylindrical friction surfaces formed thereon in a common plane normal to the axes of the plugs.

5. A liquid cooled annular brake shoe for a disc brake as set forth in claim 4, wherein said shoe member includes annular wall supporting ribs connecting said spaced apart walls, said ribs and walls forming cooling liquid passages between said bores and terminating on said one wall adjacent the peripheries of said bores.

References Cited in the file of this patent

UNITED STATES PATENTS

| | | |
|---|---|---|
| 1,633,919 | Berger | June 28, 1927 |
| 2,051,286 | Boykin | Aug. 18, 1936 |
| 2,195,130 | Hoyt | Mar. 26, 1940 |
| 2,255,024 | Eksergian | Sept. 2, 1941 |
| 2,664,176 | Whalen | Dec. 29, 1953 |
| 2,710,078 | Cardwell | June 7, 1955 |
| 2,728,422 | Kelley | Dec. 27, 1955 |
| 2,747,702 | Van Zelm | May 29, 1956 |
| 2,778,451 | Friedman | Jan. 22, 1957 |
| 2,821,271 | Sanford | Jan. 28, 1958 |
| 2,866,526 | Wiseman | Dec. 30, 1958 |
| 2,880,823 | Sedergren | Apr. 7, 1959 |
| 2,887,961 | Hawley | May 26, 1959 |
| 2,910,148 | Ferrell et al. | Oct. 27, 1959 |
| 2,911,071 | De Gelleke | Nov. 3, 1959 |

FOREIGN PATENTS

| | | |
|---|---|---|
| 701,725 | Great Britain | Dec. 20, 1953 |
| 777,763 | Great Britain | June 26, 1957 |